United States Patent [19]

Kobayashi

[11] Patent Number: 4,726,940

[45] Date of Patent: Feb. 23, 1988

[54] METHOD OF PURIFYING EXHAUST GAS

[75] Inventor: Yoshio Kobayashi, Osaka, Japan

[73] Assignee: Hitachi Zosen Corporation, Osaka, Japan

[21] Appl. No.: 865,883

[22] Filed: May 21, 1986

[51] Int. Cl.$^4$ .................. C01B 7/00; C01B 17/00; B01J 8/00

[52] U.S. Cl. ..................... 423/240; 423/244

[58] Field of Search .......... 423/242 A, 242 R, 244 A, 423/244 R, 240 R, 240 S; 55/73 (U.S. only)

[56] References Cited

U.S. PATENT DOCUMENTS

| | | | |
|---|---|---|---|
| 2,919,174 | 12/1959 | Pring | 423/240 |
| 3,343,908 | 9/1967 | Wickert | 423/244 |
| 4,181,704 | 1/1980 | Sheer et al. | 423/244 X |
| 4,201,751 | 5/1980 | Holter et al. | 423/244 X |
| 4,548,797 | 10/1985 | Sauer et al. | 423/244 X |

Primary Examiner—Gregory A. Heller
Attorney, Agent, or Firm—Barnes, Kisselle, Raisch, Choate, Whittemore & Hulbert

[57] ABSTRACT

A method of purifying an exhaust gas characterized by dispersing individually independent fine particles of a Ca-containing absorbent in a carrier gas to a high concentration by a dividing-dispersing device to which the carrier gas and the absorbent are supplied, the absorbent being up to 10 microns in mean particle diameter, introducing the resulting aerosol of high concentration into the exhaust gas to uniformly mix the aerosol with the exhaust gas and thereafter introducing the exhaust gas into a dust collector, whereby the fine particles of absorbent having absorbed harmful acid substances from the exhaust gas are removed together with dust and soot. The absorbent forming secondary agglomerates before reaching the dividing-dispersing device are divided into individually independent primary particles and then dispersed in the carrier gas by the device, so that when introduced into the exhaust gas, the absorbent reacts with the harmful acid substance over an increased area of contact to achieve an improved removal efficiency.

4 Claims, 7 Drawing Figures

METHOD OF PURIFYING EXHAUST GAS

The present invention relates to a dry method of purifying exhaust gases wherein a Ca-containing absorbent is used for absorbing and removing harmful acid substances from the exhaust gas.

Hot exhaust gases discharged from boilers or incinerators for waste materials usually contain 10 to 2000 ppm of harmful acid substances such as sulfur oxides ($SO_x$), hydrogen chloride (HCl) and hydrogen fluoride (HF). It is required to remove such substances under pollution control regulations. These harmful acid substances have heretofore been removed generally by the wet method wherein an absorbing liquid or slurry containing an alkaline absorbent is brought into direct contact with the exhaust gas as cooled to a lower temperature to purify the gas. Although achieving a high removal efficiency, this method has the problem of involving difficulties in treating the resulting waste water, necessitating reheating of the exhaust gas and being expensive in equipment and running costs.

In view of the above problem, various methods have been investigated as substitutes for the wet method. For example, it has been proposed to adsorb harmful substances by active carbon, followed by desorption, or to spray a slurry of slaked lime into the exhaust gas as a semi-wet method. However, these methods still fail to achieve high removal efficiencies. Although research was conducted on a dry method wherein particles of a Ca-containing absorbent (quick lime, slaked lime, limestone, dolomite or the like) are diffused through the interior of a hot furnace or flue, this method has not been practiced except where the environmental regulations are extremely slack as a special case, because the absorbent is low in reactivity. For example, the reactivity between the absorbent and $SO_x$ is up to about 20% at the highest, while that of the absorbent with HCl is not higher than 50%. It is generally expected that the reactivity will improve with decreasing particle size, whereas a reduction in the particle size does not lead to a noticeable increase in the reactivity of lime.

An object of the present invention is to provide a dry method of purifying exhaust gases which assures an improved reactivity between a Ca-containing absorbent, such as slaked lime or quick lime, and harmful acid substances.

To fulfil the above object, the present invention provides a method of purifying an exhaust gas characterized by dispersing individually independent fine particles of a Ca-containing absorbent in a carrier gas to a high concentration by a dividing-dispersing device to which the carrier gas and the absorbent are supplied, the absorbent being up to 10 microns in mean particle diameter, introducing the resulting aerosol of high concentration into the exhaust gas to uniformly mix the aerosol with the exhaust gas and thereafter introducing the exhaust gas into a dust collector, whereby the fine particles of absorbent having absorbed harmful acid substances from the exhaust gas are removed together with dust and soot.

The principle and embodiments of the present invention will be described below with reference to the accompanying drawings, in which.

First, the principle of the present invention will be described.

Figure 1:
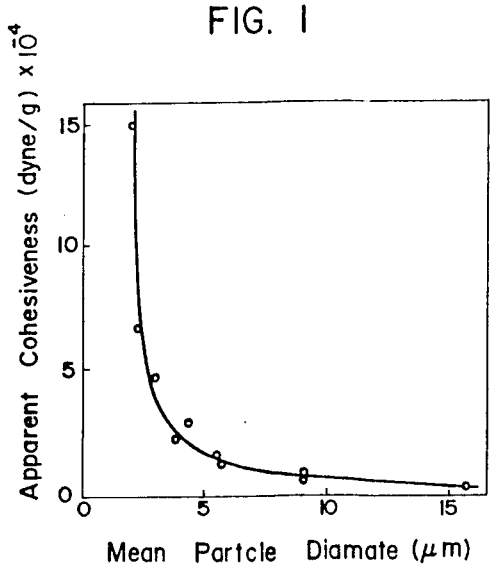
FIG. 1 is a graph showing the relationship between the mean diameter of particles and the apparent cohesiveness thereof.

Generally, individually independent fine particles (hereinafter referred to as "primary particles") of the order of microns in size tend to agglomerate. This tendency increases as the particle size decreases as shown in FIG. 1. Accordingly, when particles of 1 to 2 microns in size are sprayed into an exhaust gas through a mere pipe or nozzle as in the conventional dry method, these primary particles form secondary agglomerates before being dispersed into the exhaust gas, so that the primary particles behave as coarse particles in the exhaust gas. With the conventional method, therefore, the absorbent failed to achieve noticeably improved reactivity even when reduced in particle size.

On the other hand, it is known that secondary agglomerates, when given a definite amount of dispersing energy in a gas stream, are dispersed in the stream as divided into individual primary particles. The dispersing energy required to divide secondary agglomerates into individual primary particles and to disperse the primary particles in a gas stream can be calculated according to the following equation, as taught by Suganuma et al of Tokyo University in "KAGAKU KOGAKU RONBUNSHU (official publication of The Society of Chemical Engineers, Japan), Vol. 9, No. 2, March 1983, p.183–p.188 ".

$$31.3\epsilon^{-0.2} = D_{p50a}/D_{p50s} = 1$$

$\epsilon$: Dispersing energy [$J/m^3 \cdot se$]

$D_{p50a}$: Mass median diameter of airborne dust (secondary agglomerates) [$\mu m$]

$D_{p50a}$: Mass median diameter of powdery material (primary particles) determined by sedimentation balance [$\mu m$]

From the above viewpoint, it is useful to insert a Venturi (means for giving the dispersing energy), for example, in an exhaust gas channel and to spray an absobent, which is already in the form of secondary agglomerates, into the channel at a location upstream from the Venturi. The absorbent can then be divided into primary particles before being uniformly mixed with the exhaust gas to consequently remove harmful acid substances with an improved efficiency. However, to divide secondary agglomerates into the original primary particles, for example, of up to 5 microns in size, it is required to use a greatly constricted Venturi and to increase the velocity of the exhaust gas to as high as several tens to 300 m/sec. This entails a great pressure loss. Accordingly, to give an increased velocity to the exhaust gas itself which originally is in a large amount requires a great power consumption and therefore is not practical. According to the present invention, an absorbent and a carrier gas are supplied to a dividing-dispersing device which is used for dispersing primary particles of the absorbent in the carrier gas flowing in a small amount at a high speed to obtain an aerosol of high particle concentration, which is then uniformly mixed with an exhaust gas. Thus, a high removal efficiency or ratio can be achieved with small power consumption.

Next, embodiments of the invention will be described.

Figure 2:
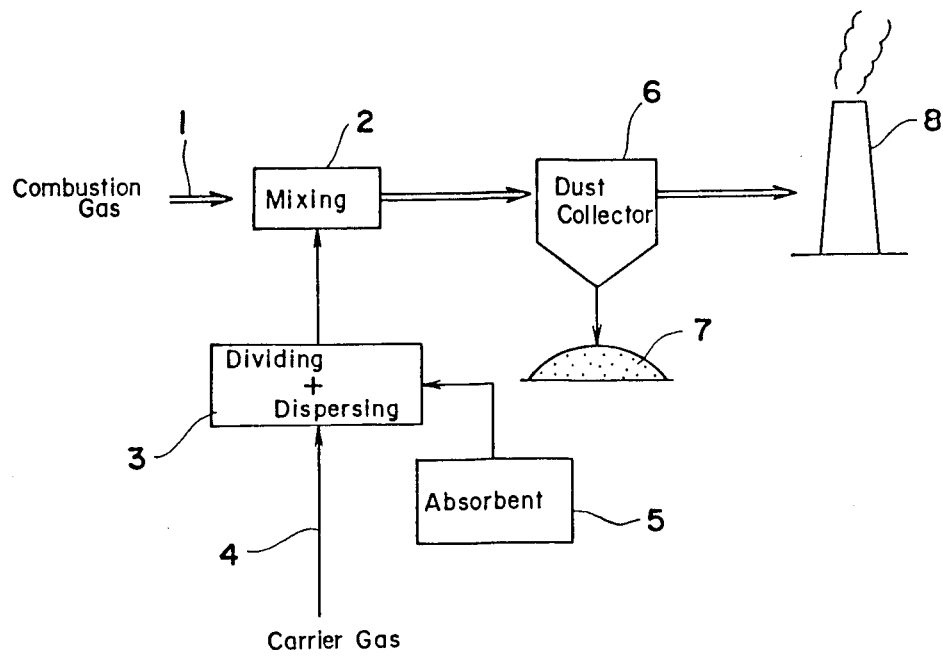
FIG. 2 is a diagram schematically showing an embodiment of system for practicing the method of the present invention.

With reference to FIG. 2, an exhaust gas 1 released from an unillustrated boiler or waste material incinerator through an exhaust gas channel is introduced into a mixing portion 2 provided in the channel. On the other hand, a carrier gas 4 and a Ca-containing absorbent 5 are fed to a dividing-dispersing device 3, which divides the absorbent 5 into primary particles and disperses them in the carrier gas 4 to a high concentration. The aerosol of high concentration from the device 3 is introduced into the mixing portion 2, where the aerosol is uniformly mixed with the exhaust gas 1. The Ca-containing absorbent (e.g. quick lime or slaked lime) reacts with the harmful acid substances (e.g. $SO_x$ and HCl) in the exhaust gas according to the following equations.

$$CaO + SO_2 + \tfrac{1}{2}O_2 \rightarrow CaSO_4$$

$$Ca(OH)_2 + SO_2 + \tfrac{1}{2}O_2 \rightarrow CaSO_4 + H_2O$$

$$CaO + 2HCl \rightarrow CaCl_2 + H_2O$$

$$Ca(OH)_2 + 2HCl \rightarrow CaCl_2 + 2H_2O$$

The absorber thus having absorbed the harmful acid substances is collected by a dust collector 6 along with soot, dust, etc. and discharged from a lower portion of the dust collector 6 as indicated at 7. On the other hand, the purified exhaust gas is released to the atmosphere through a chimney 8.

With the system described above, the concentration of primary particles of the absorbent in the carrier gas is 50 to 500 g/Nm$^3$, whereas the absorbent primary particle concentration of the exhaust gas after the mixing has been reduced to 1 to 20 g/Nm$^3$. In other words, the amount of carrier gas can be as small as 1/25 to 1/50 of the amount of exhaust gas. Thus, the amount of power consumption in this case is much smaller than when the exhaust gas itself is caused to flow at an increased velocity. Furthermore, the decrease of the concentration due to the mixing reduces the frequency of collision of the absorbent primary particles, consequently reducing the likelihood that the primary particles will re-agglomerate.

Figure 4:
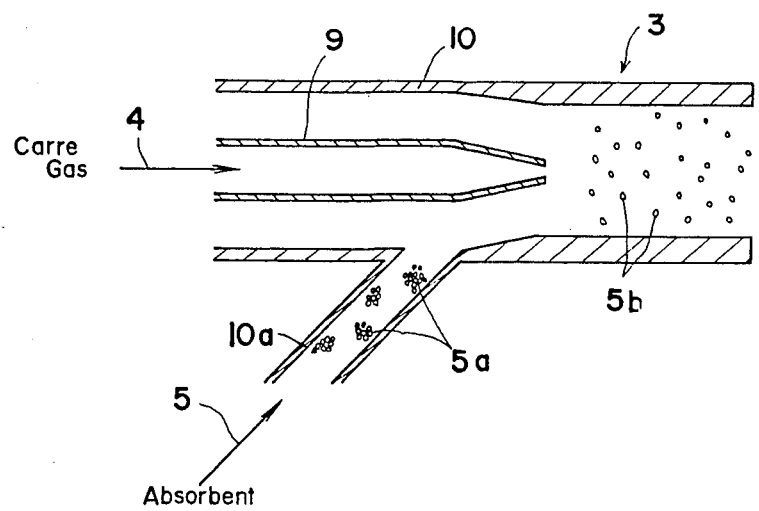
FIG. 4 is a view in longitudinal section showing an ejector which is an example of dividing-dispersing device for use in the system.
Figure 5:
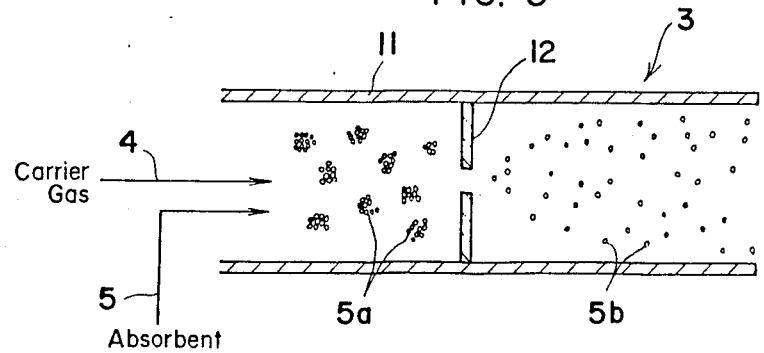
FIG. 5 is a view in longitudinal section showing an orifice tube which is another example of dividing-dispersing device for use in the system.

Usable as the dividing-dispersing device 3 is an ejector, orifice tube, Venturi tube, jet mill, mechanical crusher permitting the carrier gas to flow therethrough and having a dispersing function, or the like. As shown in FIG. 4, the ejector comprises an inner tube 9 and an outer tube 10. The carrier gas 4 is caused to jet out from the inner tube 9 and thereby given a higher velocity. The negative pressure produced in the outlet portion of the outer tube 10 draws out secondary agglomerates 5a of the absorbent 5 from a duct 10a, divides them into primary particles 5b in the outlet portion and disperses the particles in the carrier gas. As shown in FIG. 5, the orifice tube comprises a tube 11 to which the carrier gas 4 and the absorbent 5 in the form of secondary agglomerates 5a are supplied, and an orifice member having an orifice 12. The carrier gas having the secondary agglomerates entrained therein is given an increased velocity when passing through the orifice 12, whereby the agglomerates are divided into primary particles 5b, which are dispersed in the carrier gas. The Venturi tube has the same construction as shown in FIG. 5 except that the orifice member is replaced by a Venturi. The tube operates on the same principle as the tube of FIG. 5. In the jet mill, solids as entrained in a carrier gas are caused to collide with one another and thereby reduced to smaller sizes. Secondary agglomerates can be thereby divided into the original primary particles of specified size, or primary particles so sized as not to form secondary agglomerates can be divided into smaller primary particles. The mechanical crusher is used solely for dividing coarse particles into primary particles of specified size and dispersing them in a gas. In any case, the primary particles to be eventually dispersed in the carrier gas need to be up to 10 microns in mean diameter. For the present method to remove harmful acid substances with as high an efficiency as the wet method, it is required that the primary particles be up to 5 microns in mean diameter for removing HCl and 1 to 3 microns in mean diameter when removing $SO_x$.

Figure 3:
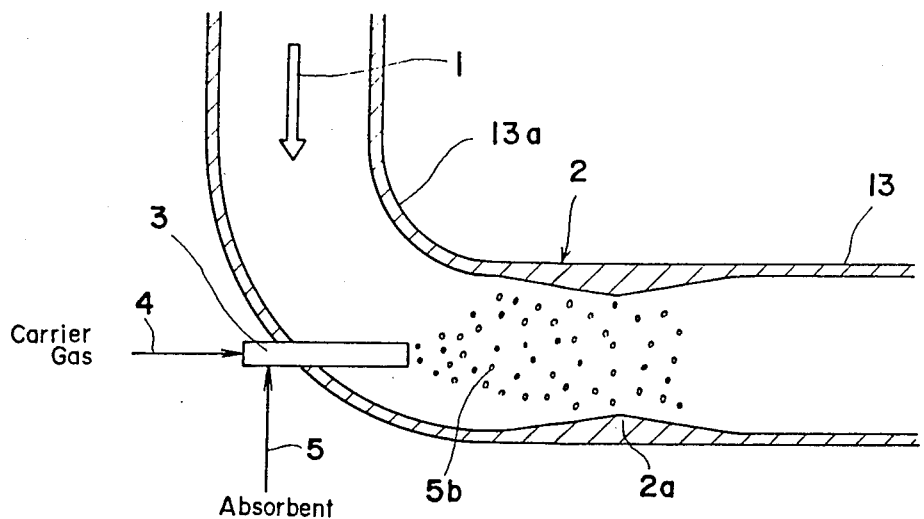
FIG. 3 is an enlarged fragmentary view in section showing the system.

In practicing the method of the present invention, it is essential to assure that the primary particles of the absorbent once dispersed will not re-agglomerate. For this purpose, it is required to minimize the length of the high-concentration aerosol channel from the dividing-dispersing device 3 to the mixing portion 2 and to eliminate a greatly bent portion from this channel to thereby preclude any turbulence. When an ejector, orifice tube or Venturi tube is used as the dividing-dispersing device 3, the device is preferably so disposed as shown in FIG. 3. In this arrangement, the device 3 is attached directly to a bent portion 13a of the exhaust gas channel 13, and the outlet of the device 3 is oriented in the same direction as the flow of exhaust gas flowing downward from the bent portion 13a. Accordingly, the primary particles 5b from the dividing-dispersing device 3 is sprayed directly into the mixing portion 2 without being passed through an intermediate conduit. This almost completely eliminates the likelihood of re-agglomeration. Preferably, the mixing portion 2 is provided with a diffuser 2a for promoting even distribution of primary particles 5b in the exhaust gas 1. The portion of the exhaust gas channel 13 from the bent portion 13a to the dust collector 6 has a space of such a volume that the primary particles 5b will be suspended in the exhaust gas 1 for about 1 to about 3 seconds before reaching the dust collector 6. The diffuser 2a although basically the same as the Venturi, is not intended to give an increased velocity to the exhaust gas 1 and thereby divide secondary agglomerates into primary particles, therefore is not greatly constricted and does not give rise to the problem of pressure loss substantially. Primary particles of the absorbent can be sprayed into the boiler or the waste material incinerator.

Examples of Ca-containing absorbents usable in a high temperature range of 900° to 1200° C. are limestone [chiefly $CaCO_3$], quick lime [CaO], slaked lime [CaOH], dolomite [$CaMg(OH)_4$]. At high temperatures of 900° to 1200° C., limestone, slaked lime, dolomite and slaked dolomite instantaneously undergo thermal decomposition (with release of $H_2O$, $CO_2$) to form porous, highly reactive quick lime or calcined dolomite, so that these materials afford better results than quick lime and calcined dolomite (commercial product is usually crystallized). When used at temperatures above 1200° C., quick lime and calcined become progressively crystallized and therefore lower in reactivity. On the other hand, examples of Ca-containing absorbers usable in a temperature range of 150° to 400° C. are quick lime, slaked lime, calcined dolomite and slaked dolomite, among which slaked lime and slaked dolomite are preferable to use.

Usually, a bag filter or electrical precipitator is used as the dust collector 6.

The advantages of the present method will become apparent from the following examples.

EXAMPLE 1

Slaked lime was used as a Ca-containing absorber for the system of FIG. 2, in which the dividing-dispersing device was an ejector (Model TB-1, product of Atsuji Tekko Co., Ltd.) for preparing an aerosol of high concentration. The ejector was inserted in an exhaust gas duct through which a simulated exhaust gas having a temperature of 250° C. and containing about 1000 ppm of HCl was flowing, with the outlet of the ejector oriented in the direction of flow of the exhaust gas. To mix the aerosol with the exhaust gas effectively, the exhaust gas duct was constricted at a location immediately downstream from the ejector to form a diffuser. The ejector was operated by passing compressed air having a pressure of 5 kg/cm$^2$ G at a flow rate of 6.0 Nm$^3$/hr, and slaked lime was thereby sprayed into the exhaust gas duct at a rate of 5 kg/hr. It took about 2 seconds for the primary particles of slaked lime to reach the dust collector.

Figure 6:
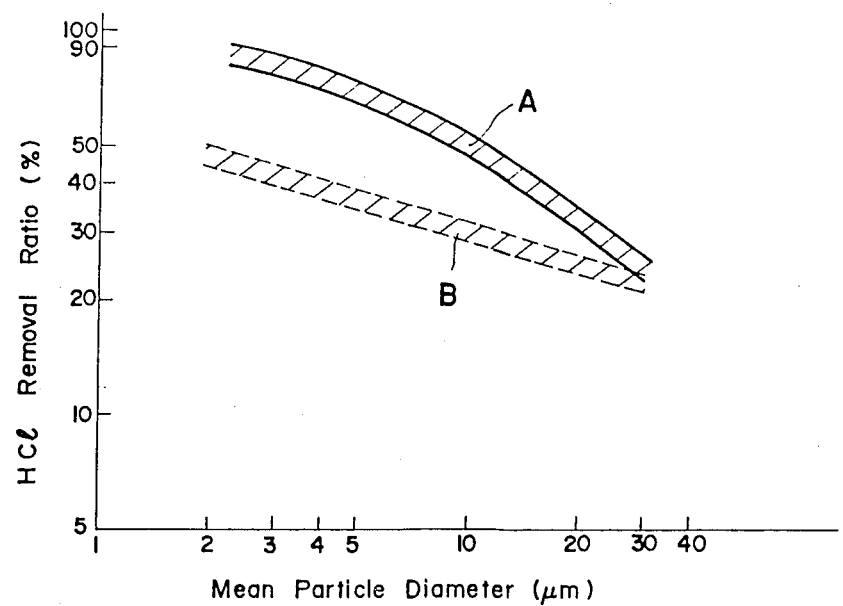
FIG. 6 is a graph showing the relationship between the mean particle dismeter of a Ca-containing absorbent (slaked lime) and the HCl removal ratio thereof.

The above procedure was repeated with use of slaked limes of varying particle sizes (primary particles of varying diameters). FIG. 6 shows the results.

In FIG. 6, indicated at A are HCl removal ratios achieved by slaked lime according to the method of the invention, and at B HCl removal ratios achieved by slaked lime according to the conventional dry method. It is seen that the reactivity improves with decreasing particle size more remarkably in the case of the invention than with the conventional method.

EXAMPLE 2

Figure 7:
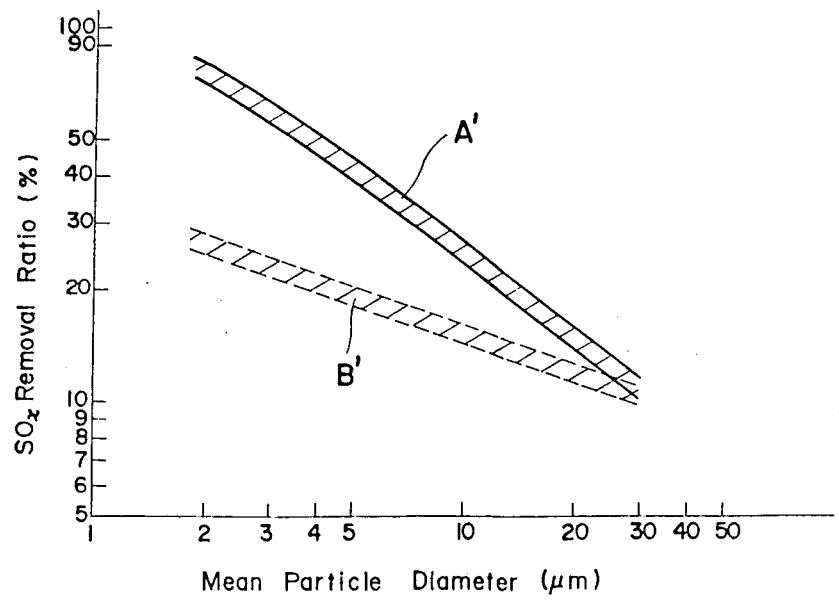
FIG. 7 is a graph showing the relationship between the mean particle diameter of the absorbent (slaked lime) and the $SO_x$ removal ratio thereof.

The same procedure as in Example 1 was repeated with the exception of the following.
Simulated exhaust gas
  Contained substance: about 1000 ppm of SO$_x$
  Temperature: about 1100° C.
  Flow rate: about 1900 Nm$^3$/hr
Ejector
  Air flow rate: 6.3 Nm$^3$/hr
  Rate of spray of particles: 7.4 kg/hr FIG. 7 shows the results achieved by the above experiment. Indicated at A' and B' in FIG. 7 are the results achieved by the invention and the conventional method, respectively. It is seen that the method of the invention is effective also on SO$_x$.

What is claimed is:

1. A method of purifying an exhaust gas which contains HCl flowing through an exhaust gas passage comprising; preparing an aerosol by dispersing substantially individually independent fine particles of Ca-containing absorbent, which have a mean particle size of up to 5 microns, at a high concentration of 50 to 500 g/Nm$^3$ in a carrier gas flowing at a high speed of several tens to 300 m/s to entrain therein the absorbent; introducing the aerosol of the said carrier gas and absorbent into the exhaust gas passage and uniformly mixing the aerosol with the exhaust gas which contains the HCl and has a temperature range of 150° to 400° C., the introduction and mixing being conducted so that the individual absorbent particles do not agglomerate during the transfer into the exhaust passage and the absorbent particles concentrate at 1 to 20 g/Nm$^3$ in the exhaust gas; thereafter removing the absorbent particles, which have absorbed the HCl, together with dust and soot, from the exhaust gas.

2. A method as defined in claim 1 wherein the Ca-containing absorbent is at least one member selected from the group consisting of quick lime, slaked lime, calcined dolomite and slaked dolomite.

3. A method of purifying an exhaust gas which contains SO$_x$ flowing through an exhaust gas passage comprising; preparing an aerosol by dispersing substantially individually independent fine particles of Ca-containing absorbent, which have a mean particle size of 1 to 3 microns, at a high concentration of 50 to 500 g/Nm$^3$ in a carrier gas flowing at a high speed of several tens to 300 m/s to entrain therein the absorbent; introducing the aerosol of the said carrier gas and absorbent into the exhaust gas passage and uniformly mixing the aerosol with the exhaust gas which contains the SO$_x$ and has a temperature range of 900° to 1200° C., the introduction and mixing being conducted so that the individual absorbent particles do not agglomerate during transfer into the exhaust passage and the absorbent particles concentrate at 1 to 20 g/Nm$^3$ in the exhaust gas; thereafter removing the absorbent particles, which have absorbed the SO$_x$, together with dust and soot, from the exhaust gas.

4. A method as defined in claim 3 wherein the Ca-containing absorbent is at least one member selected from the group consisting of limestone, quick lime, slaked lime, dolomite, calcined dolomite and slaked dolomite.

* * * * *